(12) United States Patent
Boehm

(10) Patent No.: US 11,441,292 B2
(45) Date of Patent: Sep. 13, 2022

(54) APPARATUS AND METHOD FOR INSTALLING SUBSURFACE TUBING

(71) Applicant: Alldrip Sports Fields, LLC, Bryan, TX (US)

(72) Inventor: Matthew Christopher Boehm, Bryan, TX (US)

(73) Assignee: Alldrip Sports Fields, LLC, Bryan, TX (US)

( * ) Notice: Subject to any disclaimer, the term of this patent is extended or adjusted under 35 U.S.C. 154(b) by 0 days.

(21) Appl. No.: 17/103,446

(22) Filed: Nov. 24, 2020

(65) Prior Publication Data
US 2022/0162831 A1    May 26, 2022

(51) Int. Cl.
| | |
|---|---|
| E02F 5/10 | (2006.01) |
| F16L 1/032 | (2006.01) |
| E02F 5/08 | (2006.01) |
| E02F 5/12 | (2006.01) |

(52) U.S. Cl.
CPC ............... *E02F 5/10* (2013.01); *E02F 5/08* (2013.01); *E02F 5/12* (2013.01); *F16L 1/032* (2013.01)

(58) Field of Classification Search
CPC .................................. F16L 1/032; F16L 3/22
See application file for complete search history.

(56) References Cited

U.S. PATENT DOCUMENTS

| | | | | |
|---|---|---|---|---|
| 3,391,545 A * | 7/1968 | Linneman | ............... | E02F 5/102 405/157 |
| 4,197,036 A * | 4/1980 | Masquelier | ............. | E02F 3/181 37/142.5 |
| 4,637,755 A * | 1/1987 | Tollefson | ................ | E02F 5/102 405/174 |
| 4,812,078 A | 3/1989 | Rivard | | |
| 6,637,978 B1 | 10/2003 | Genta | | |
| 7,524,142 B2 | 4/2009 | Scott | | |
| 8,578,682 B2 * | 11/2013 | May | ..................... | A22C 11/125 53/138.4 |
| 9,267,620 B2 * | 2/2016 | Sjodahl | ..................... | E02F 7/02 |
| 10,760,244 B1 * | 9/2020 | Villette | ..................... | F16L 1/11 |

FOREIGN PATENT DOCUMENTS

DE    102014105577 A1    10/2015

OTHER PUBLICATIONS

International Search Report and Written Opinion dated Mar. 23, 2022 for International Application No. PCT/US2021/060671.

* cited by examiner

*Primary Examiner* — Sean D Andrish
(74) *Attorney, Agent, or Firm* — Mackey Law Firm PLLC

(57) ABSTRACT

An apparatus for installing multiple strands of hose below a surface of terrain is provided. The apparatus comprises a chassis and rotating trenching blade assemblies connected to the chassis. The trenching blade assemblies are configured to dig parallel trenches when the apparatus is pulled along the terrain. Curved hose guides are connected to the chassis in trailing positions behind the trenching blades. Each hose guide receives hose from a hose reel on reel mounts connected to the chassis and deposits the hose into a trench dug by a trenching blade assembly. Trench fillers connected to the chassis trail the hose guides. Each trench filler is aligned with a respective hose guide and comprises a number of blades configured to push soil excavated from a trench back into the trench when the apparatus is pulled along the terrain.

18 Claims, 18 Drawing Sheets

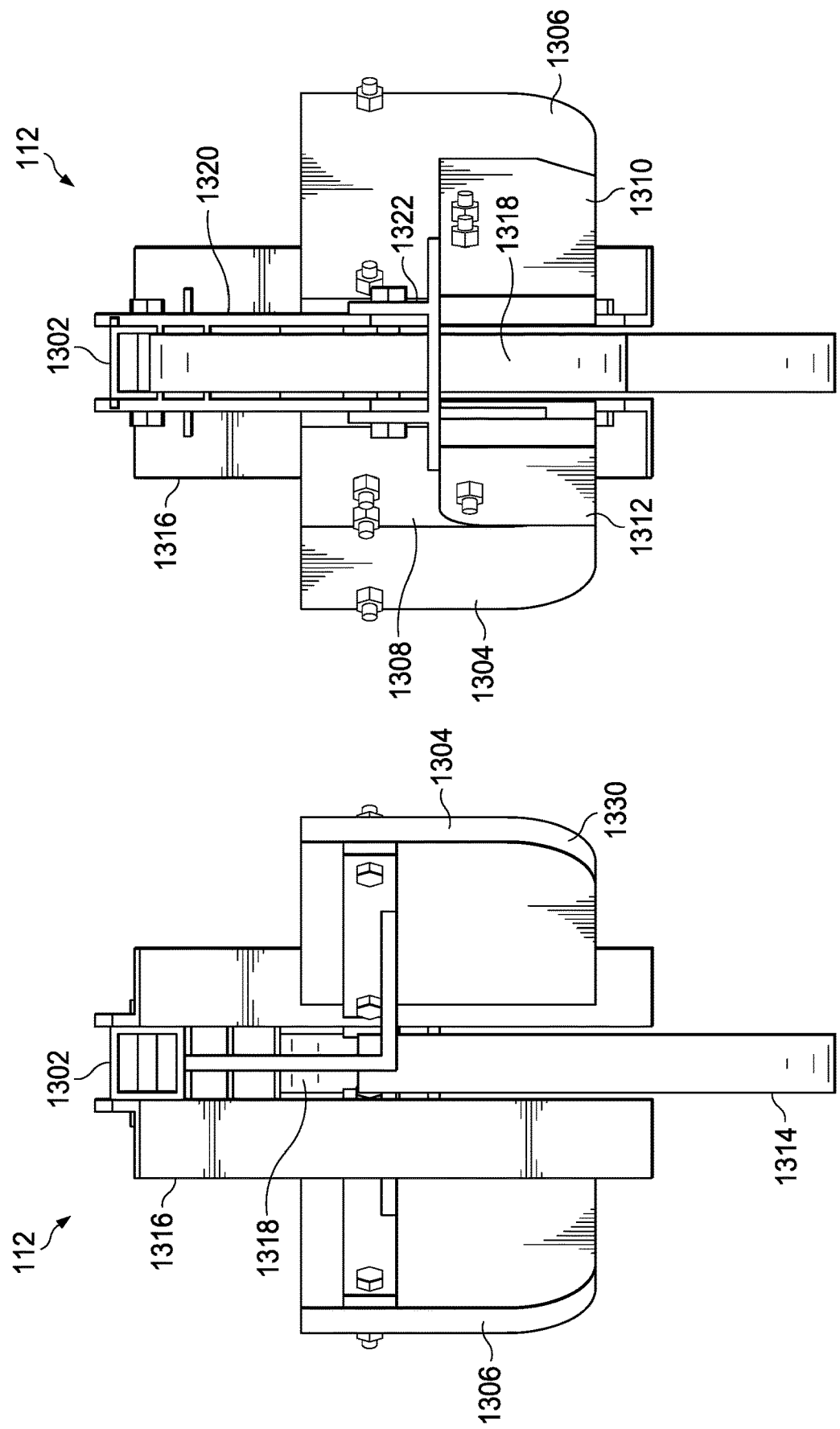

APPARATUS AND METHOD FOR INSTALLING SUBSURFACE TUBING

BACKGROUND INFORMATION

1. Field

The present invention relates generally to the installation of flexible tubing below ground and more specifically the installation of irrigation tubing.

2. Background

A popular method of irrigation comprises the use of dripline conduits installed below the surface of terrain. Such driplines comprise tubing with holes at intervals along its length through which water can seep into the ground. Sub-surface dripline irrigation has the advantage of delivering water more directly to plant roots without the problem of evaporation off the surface, wind causing the sprayed water to drift from its intended target, and run off before absorption into soil.

The drip irrigation market has primarily been dominated by the agricultural industry. For many years, farmers have installed drip tape (as opposed to drip tubing) to irrigate crops. Drought conditions across the US have begun to impact large end users of water such as municipalities, Parks & Recreation divisions, private sports associations, and even school districts. These entities have begun to consider the use of drip irrigation on their sport fields to help address water issues as well as other factors associated with the watering of sport fields including water costs and day to day maintenance of the irrigation systems.

Sub-surface installation of dripline can be very labor intensive and time consuming. Furthermore, manual installation over large areas such as, e.g., athletic fields, poses challenges for even and consistent distribution of the dripline and irrigation across the specified area.

Typically, budgeting costs for drip irrigation are double that of rotor irrigation systems. This cost difference is in part due to the lack of proper machinery available, needed to create a mechanical advantage significant enough to produce installation efficiencies that make sub-surface drip installation just as cost effective as traditional rotor system installation.

SUMMARY

An illustrative embodiment provides an apparatus for installing multiple strands of hose simultaneously below a surface of terrain. The apparatus comprises a chassis and a number of rotating trenching blade assemblies connected to the chassis approximately parallel to each other. The trenching blade assemblies are configured to dig respective trenches in the terrain when the apparatus is pulled along the terrain. A number of reel mounts are connected to the chassis and are configured to hold reels of hose. A number of curved hose guides are connected to the chassis in trailing positions relative to the trenching blade assemblies. Each hose guide is aligned with a corresponding trenching blade assembly and is configured to receive hose from a respective hose reel mounted on one of the reel mounts and deposit the hose into a trench dug by the corresponding trenching blade assembly. A number of trench filler-packers are connected to the chassis in trailing positions relative to the hose guides. Each trench filler-packer is aligned with a corresponding hose guide. The trench filler-packers comprise a number of blades configured to push soil excavated from the trenches back into the trenches when the apparatus is pulled along the terrain.

Another illustrative embodiment provides an apparatus for installing multiple strands of hose simultaneously below a surface of terrain. The apparatus comprises a chassis with a rotating shaft and a power take off gearbox configured to drive the shaft. Four trenching blade assemblies are connected to the rotating shaft, wherein the trenching blade assemblies are spaced 10 to 24 inches apart and are configured to dig parallel trenches in the terrain when the apparatus is pulled along the terrain. Two reel mounts are connected to the chassis. Each reel mount comprises a swiveling T bar configured to hold two reels of coiled hose. Four curved hose guides are connected to the chassis in trailing positions relative to the trenching blade assemblies. Each hose guide is aligned with a corresponding trenching blade assembly and comprises a tube configured to receive a hose from a respective hose reel mounted on one of the reel mounts and deposit the hose into a trench dug by the corresponding trenching blade assembly. Four trench filler-packers are connected to the chassis in trailing positions relative to the hose guides. Each trench filler-packer is aligned with a corresponding hose guide and comprises at least three successive blades offset from each other and configured to push soil excavated from one of the trenches back into the trench and at least two packing wheels interspersed with the blades, wherein the packing wheels are configured to pack soil pushed into the trench by the blades of the trench filler-packers as the apparatus is pulled along the terrain.

Another illustrative embodiment provides a method of installing hose simultaneously below a surface of terrain. The method comprises pulling an apparatus over the terrain. The apparatus comprises: a chassis; a number of rotating trenching blade assemblies connected to the chassis approximately parallel to each other, wherein the trenching blade assemblies are configured to dig respective trenches in the terrain when the apparatus is pulled along the terrain; a number of reel mounts connected to the chassis, wherein the reel mounts are configured to hold reels of hose; a number of curved hose guides connected to the chassis in trailing positions relative to the trenching blade assemblies, wherein each hose guide is aligned with a corresponding trenching blade assembly and is configured to receive hose from a respective hose reel mounted on one of the reel mounts and deposit the hose into a trench dug by the corresponding trenching blade assembly; and a number of trench filler-packers connected to the chassis in trailing positions relative to the hose guides, wherein each trench filler-packer is aligned with a corresponding hose guide, and wherein the trench filler-packers comprise a number of blades configured to push soil excavated from the trenches back into the trenches when the apparatus is pulled along the terrain. Hose is fed from reels on the reel mounts into the hose guides as the apparatus is pulled over the terrain.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 13 depicts a front view of a soil grading and packing device attachment of a subsurface tubing installation apparatus in accordance with an illustrative embodiment;

FIG. 14 depicts a rear view of a soil grading and packing device attachment of a subsurface tubing installation apparatus in accordance with an illustrative embodiment;

DETAILED DESCRIPTION

The illustrative embodiments recognize and take into account one or more different considerations. For example, the illustrative embodiments recognize and take into account that high labor costs and low adherence to manufacturers' recommended specifications during installation are two barriers preventing broader adoption of sub-surface dripline irrigation.

The illustrative embodiments also recognize and take into account that manual sub-surface installation of dripline can be time consuming and subject to inconsistency of line placement in both width apart and depth, especially over large areas.

The illustrative embodiments also recognize and take into account that products in the commercial market that can install subsurface drip irrigation having respective disadvantages. For example, single-row plows are labor intensive and are not capable of evenly and accurately spacing multiple strands of dripline during installation. Large scale multiple-row plows are set at a fixed spacing and are not capable of being adjusted to accommodate the type of soil into which dripline is to be installed. Different soil types absorb water at different rates. Consequently, the spacing of the dripline often needs to be adjusted according to soil type. In addition to the cost of machinery being expensive, multi-row plows also install dripline at a relatively slow pace, minimally contributing to the mechanical advantage that should be created with the capital investment in the equipment, thereby making multi-row plows an unattractive economic option to use by organizations.

The illustrative embodiments provide an apparatus for trenching, laying flexible tubing/hose into the trench, grading and packing the soil back into the trench over the tubing/hose in a single pass. The apparatus can be pulled along the ground to dig parallel trenches a specified distance apart while depositing flexible tubing such as dripline into the trenches and then covering the dripline, refilling the excavated soil back into the trenches, and packing the refilled soil in one continuous process.

The illustrative embodiments allow accurate mass installation of sub surface drip irrigation according to manufacturer recommend specifications. The illustrative embodiments reduce installation labor costs by substantially increasing installation speed, while also accurately and consistently installing the dripline to a pre-set width and depth.

Figure 1:
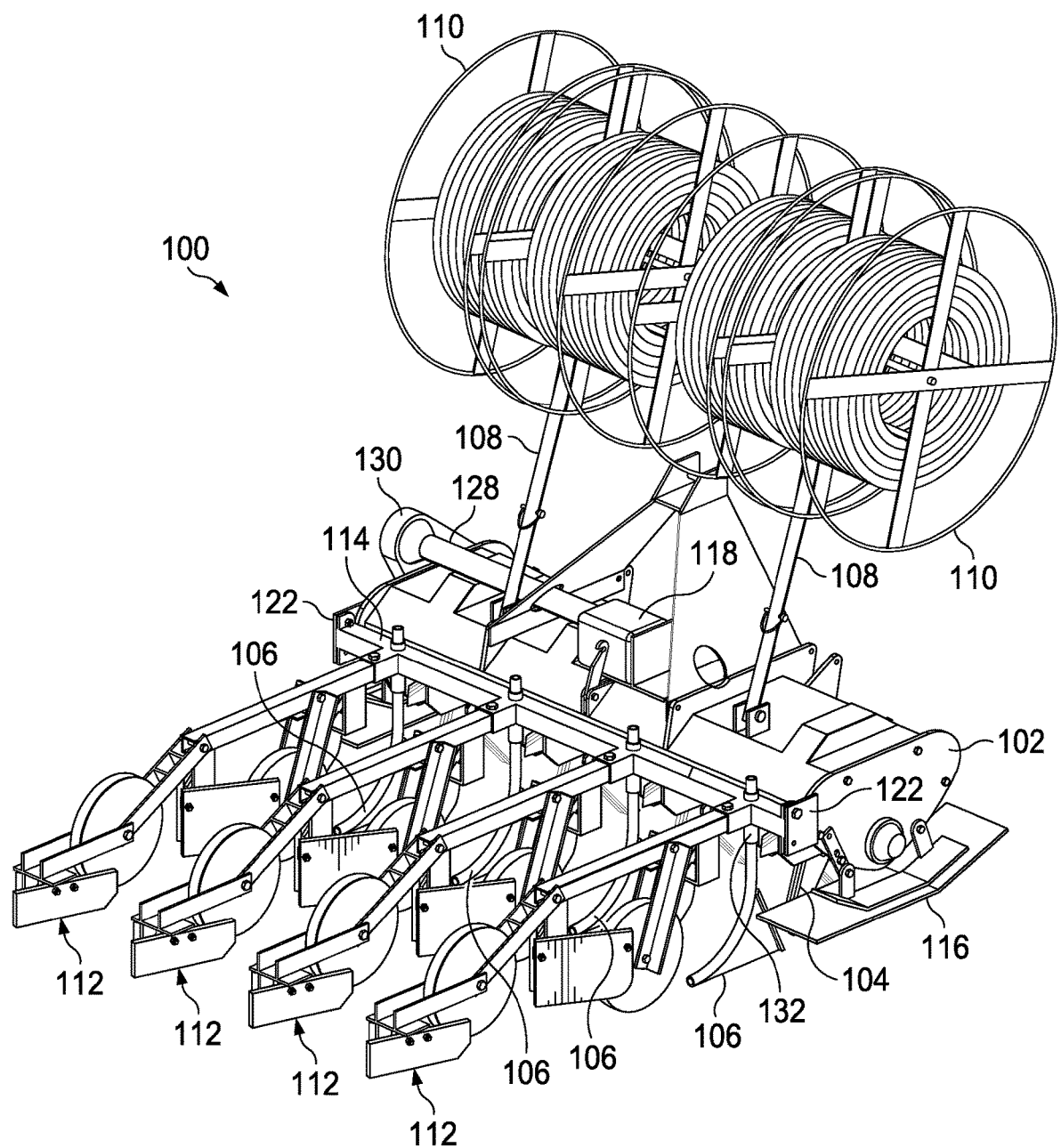
FIG. 1 depicts a rear perspective view of a subsurface tubing installation apparatus in accordance with an illustrative embodiment.
Figure 2:
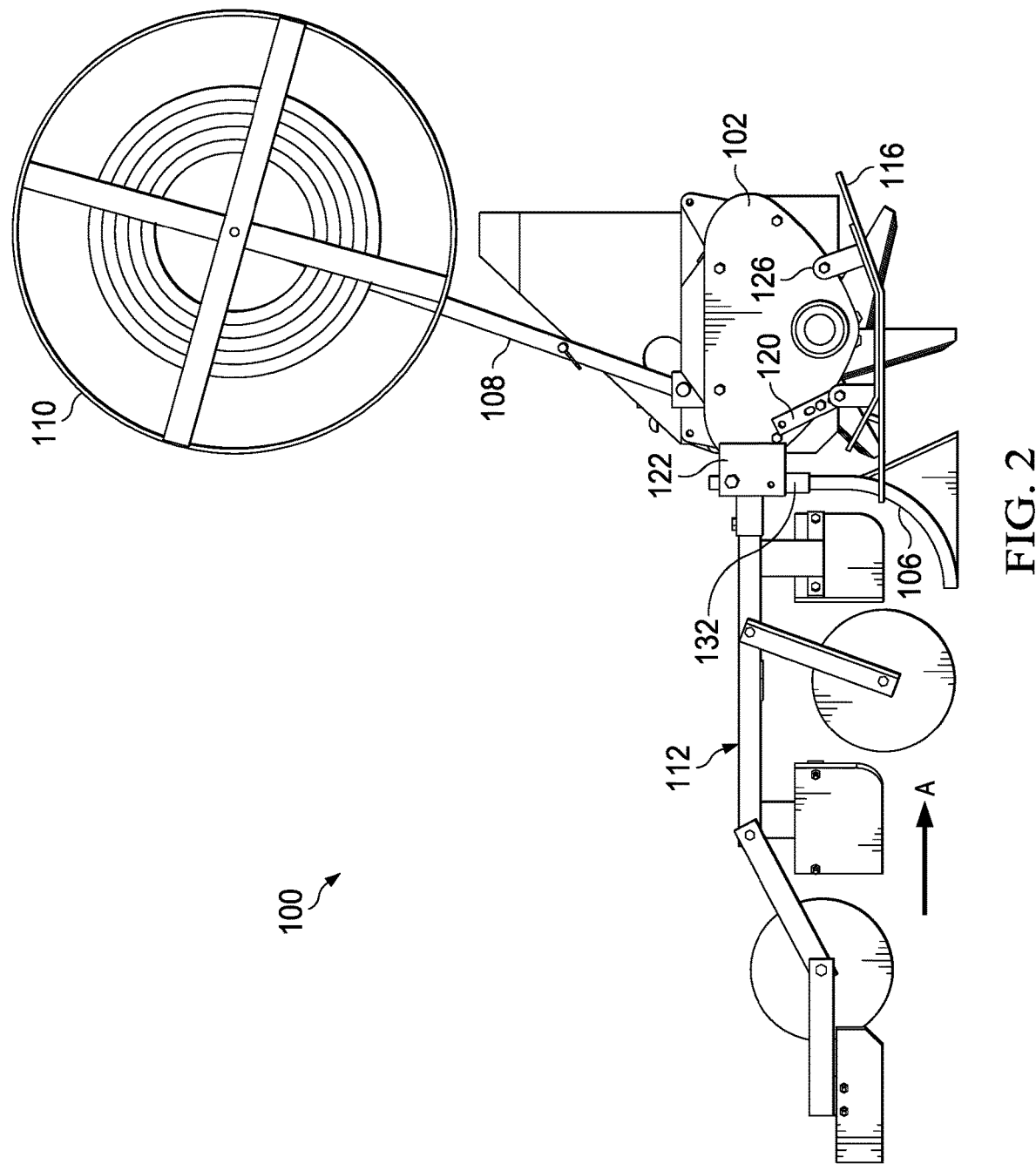
FIG. 2 depicts a side view of the subsurface tubing installation apparatus in accordance with an illustrative embodiment.
Figure 3:
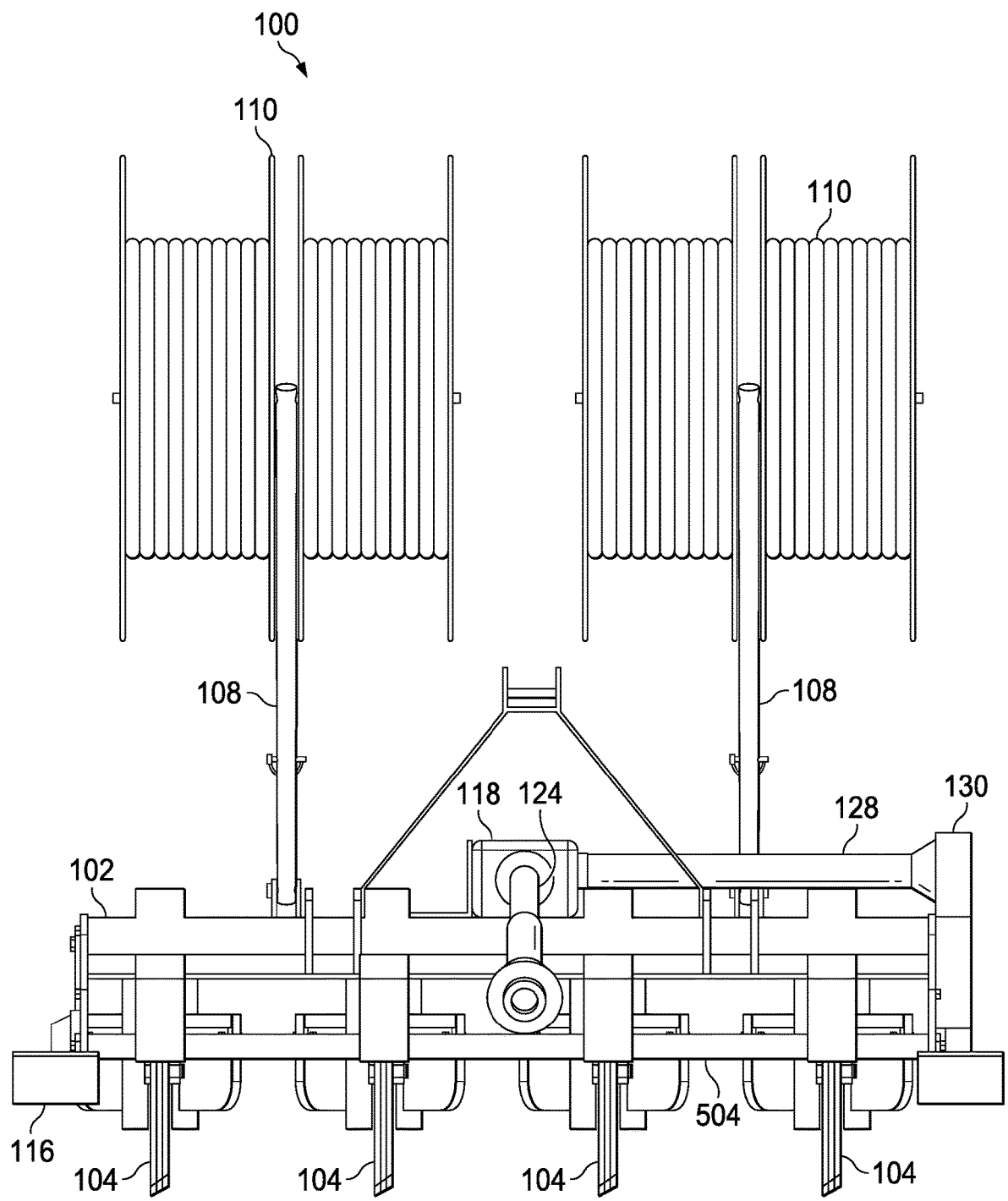
FIG. 3 depicts a front view of the subsurface tubing installation apparatus in accordance with an illustrative embodiment.

FIG. 1 depicts a rear perspective view of a subsurface tubing installation apparatus in accordance with an illustrative embodiment. FIG. 2 depicts a side view of the subsurface tubing installation apparatus. FIG. 3 depicts a front view of the subsurface tubing installation apparatus. Installation apparatus 100 is configured to be attached to a tractor or similar vehicle and pulled along the ground/terrain in the direction shown by arrow A. Movement of the installation apparatus 100 along the ground is facilitated by ground slides 116 on opposites sides of the chassis 102.

A number of shrouded, rotating trenching blade assemblies 104 are connected to chassis 102 approximately parallel to each other, shown most clearly in FIG. 3. In the present example, the trenching blade assemblies 104 are designed for reverse rotation digging. The trenching blade assemblies 104 are configured to dig respective parallel trenches in the terrain when the apparatus 100 is pulled along the terrain. The trenching blade assemblies 104 can be spaced 10 to 24 inches apart on chassis 102.

In the present example, there are four trench blade assemblies 104 connected to the chassis 102. However, more or less trenching blade assemblies can be used depending on the needed application. In an embodiment (not shown), up to eight or more rows might be used, depending on row spacing. In another embodiment (not shown), only a single trenching blade assembly might be present. The number of trenching blade assemblies (and therefore parallel trenches dug simultaneously) will depend on user needs. The width of the trenching blades (and therefore trenches) can be increased or decreased depending on application.

A number of reel mounts 108 are connected to the chassis 102. The reel mounts 108 are configured to hold reels 110 of hose/tubing. The hose/tubing might comprise irrigation dripline that includes holes at set intervals along its length to allow water to seep out as it flows through the hose.

A number of curved hose guides 106 connected to the chassis 102 in trailing positions relative to the trenching blade assemblies 104. Each hose guide 106 is aligned with a corresponding trenching blade assembly and is configured to receive hose from a respective hose reel 110 mounted on one of the reel mounts 108 and deposit the hose into a trench dug by the corresponding trenching blade assembly 104.

A number of trench filler-packers (i.e. soil grading and packing attachments) 112 are connected to the chassis 102 in trailing positions relative to the hose guides 106. Each trench filler-packer 112 is aligned with a corresponding hose guide 106. The trench filler-packers 112 comprise a number of blades configured to push soil excavated from the trenches back into the trenches when the apparatus is pulled along the terrain. Trench filler-packers 112 also incorporate a number of packing wheels configured to pack soil pushed into the trenches by the blades as the apparatus is pulled along the terrain.

Figure 5:
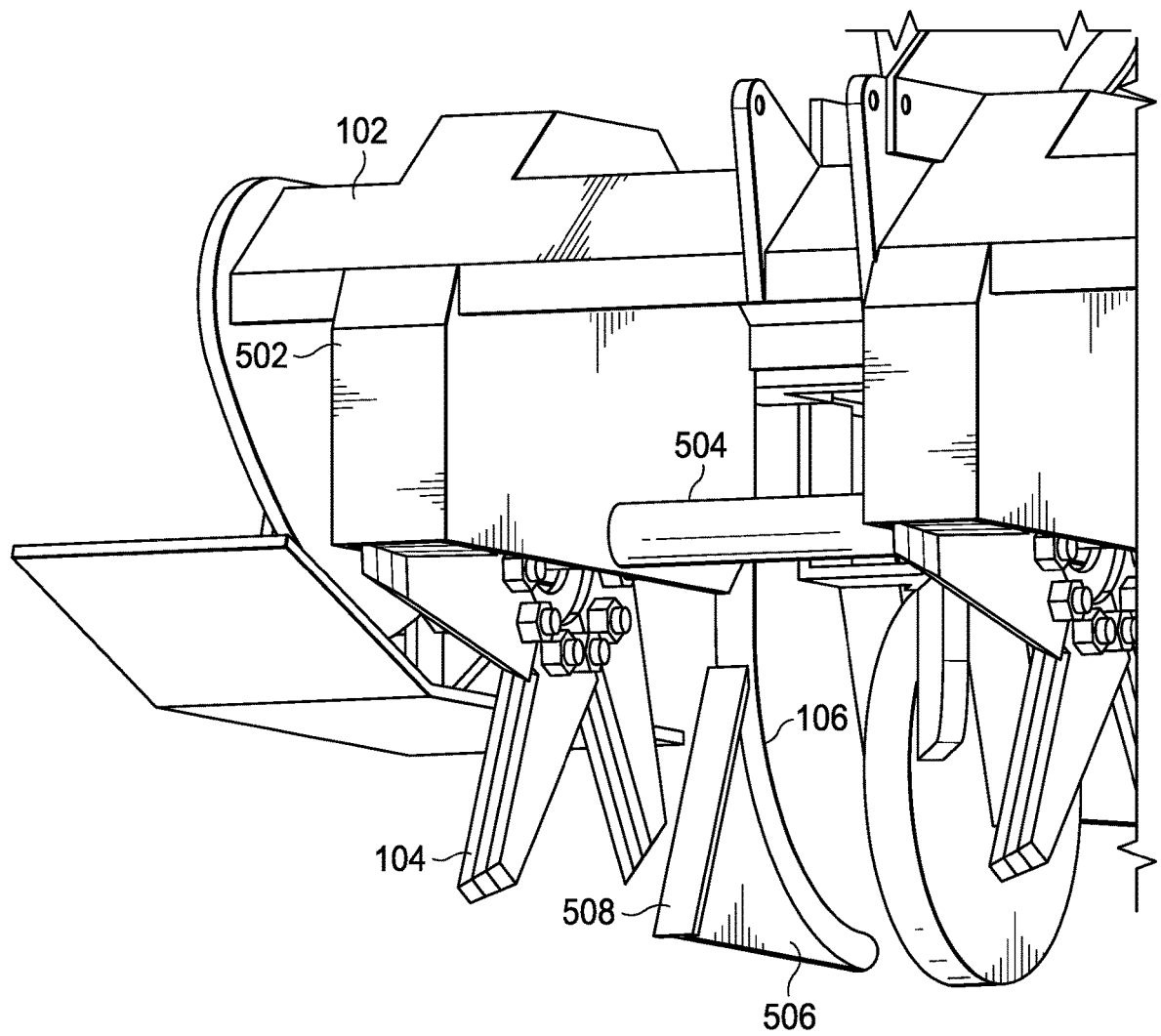
FIG. 5 depicts a front, lower perspective view of a shrouded trenching blade assembly under the subsurface tubing installation apparatus in accordance with an illustrative embodiment.

In an embodiment, rotation of the trenching blade assemblies 104 can be provided by a gearbox differential 118 through output shaft 128 and gearbox 130 to rotation shaft 504 (shown more clearly in FIG. 5). In the example shown, gearbox differential 118 comprises a single output differential in which power to transfer to only one output shaft 128 and gearbox 130. In an alternate embodiment (not shown) differential 118 might comprise a dual output T-shaped differential with second output shaft and gearbox symmetrically opposite shaft 128 and gearbox 130. In the present example, differential 118 is driven by drive shaft 124, which in turn might be driven by a power takeoff (PTO) in a tractor or similar vehicle pulling the installation apparatus 100. Alternatively, gearbox differential 118 might be hydraulically driven, or one or more hydraulic motors might supply power directly to the trenching blade assemblies in place of the power train formed by drive shaft 124 and differential 118.

The curved hose guides 106 and trench filler-packers 112 are connected to crossbar 114, which is coupled to the chassis 102 via end plates 122 at opposite ends of the chassis 102. Each curved hose guide 106 passes through a collar 132 in crossbar 114. Collars 132 serve to reinforce the curved hose guides 106 and prevent them from bending under load.

Figure 23:
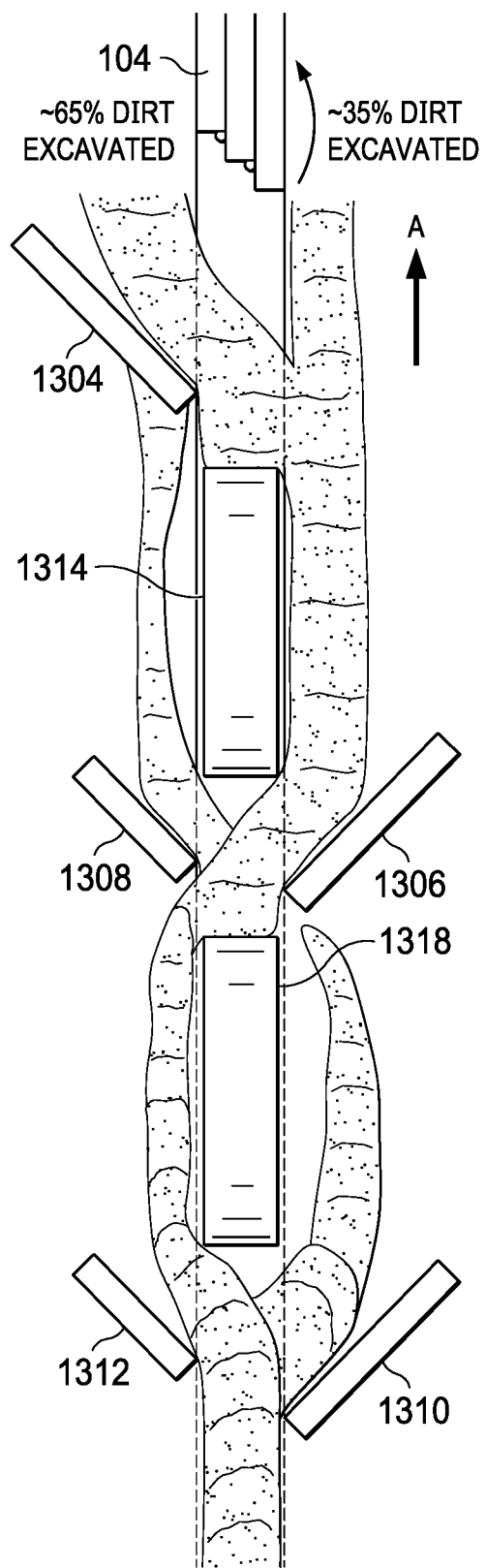
FIG. 23 illustrates refilling and packing soil into trenches in accordance with an illustrative embodiment.

Crossbar 114 can rotate on end plates 122, allowing the trench filler-packers 112 and hose guides 106 to be moved into an upright position, shown in FIG. 23, for storage as well as to reset the machine as it turns between passes during installation.

The depth at which the dripline is installed underground can be adjusted using dripline adjustment bars 120 on the sides of the chassis 102, which allow the chassis to rotate around height pivot hinges 126 connected to the ground slides 116. By changing the height/angle of the chassis 102 concurrently adjusts the depth of the trenching blade assemblies 104 and curved hose guides 106 and the height of the trench filler-packers 112. The depth of the trenches dug by the blade assemblies 104 might be adjusted, e.g., from one to five and eight inches, depending on the needed application. The ability to adjust the depth of the blade cut and dripline installation is particularly helpful for retrofit installations of existing fields or installation of a new field that will have additional dirt added to the top.

Figure 4:
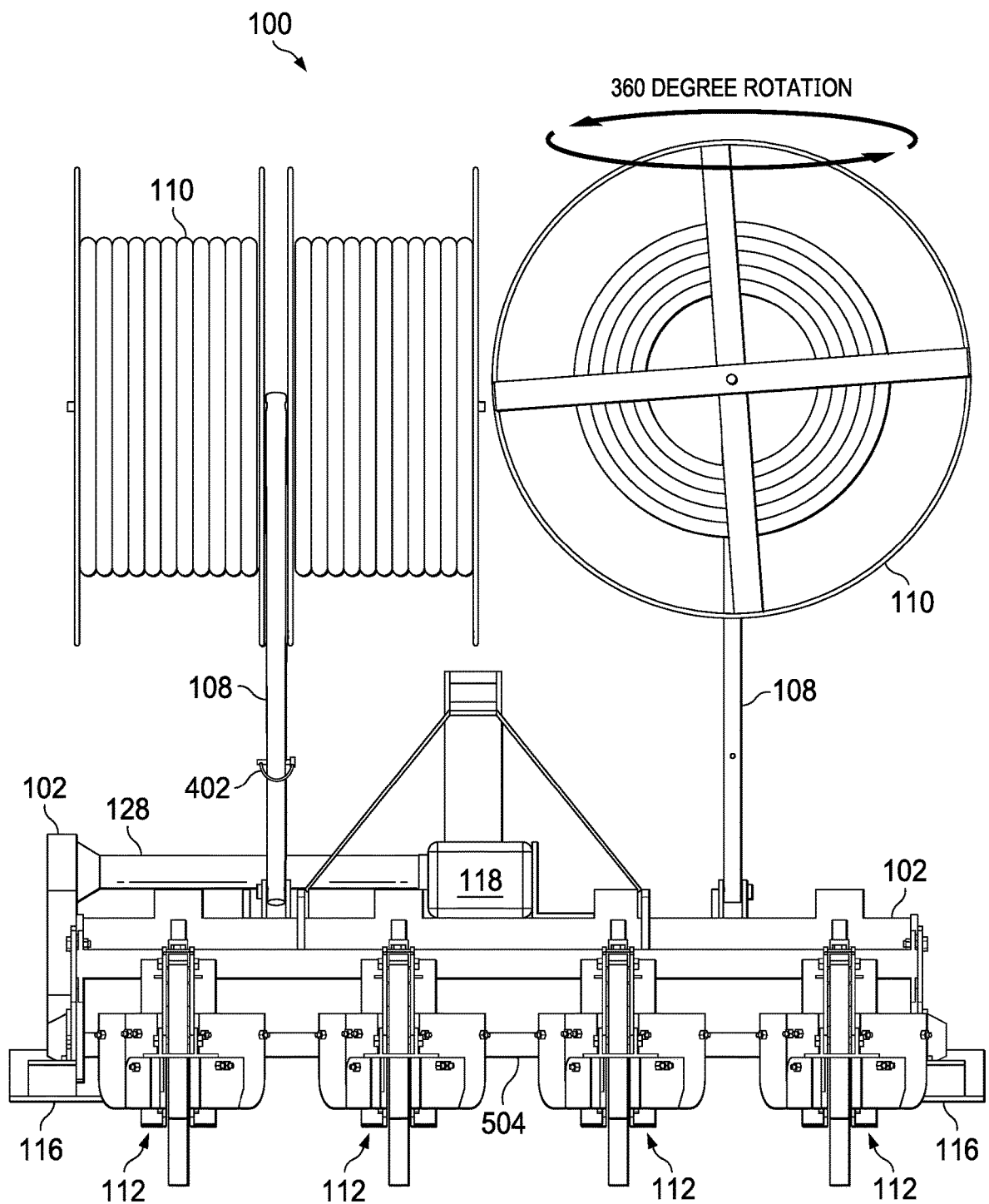
FIG. 4 depicts a back view of the subsurface tubing installation apparatus illustrating rotation of a tubing reel mount in accordance with an illustrative embodiment.

FIG. 4 depicts a back view of the subsurface tubing installation apparatus illustrating rotation of a tubing reel mount in accordance with an illustrative embodiment. The reel mounts 108 comprise swiveling T bar racks with a shaft that inserts into a sleeve. The reel mounts 108 can be fixed in position by means of a swivel pin 402. When the swivel pin 402 is removed, the reel mounts 108 can be swiveled within the sleeve, allowing 360° rotation. Rotating the reel mounts 108 permits installation and removal of the hose reels 110, particularly the inner reels.

FIG. 5 depicts a front, lower perspective view of a shrouded trenching blade assembly under the subsurface tubing installation apparatus in accordance with an illustrative embodiment. This view better illustrates the shroud 502 surrounding the trenching blade assembly 104. Also depicted is the drive shaft 504 that rotates the trenching blade assembly 104.

In an embodiment, trenching blade assembly 104 rotates in reverse, meaning forward from the ground up (i.e. the blade in contact with the ground rotates in the direction of arrow A in FIGS. 1-4). This reverse rotation of the blade assembly 104 allows the blades to "grab" the ground, pulling the apparatus 100 toward the ground to cut through it. In contrast, empirical testing indicates that a forward rotation (forward from the top down) has the possible effect of pushing up from the ground, thereby lifting the chassis rather than digging into the dirt, depending on soil conditions.

The efficiency with which the blade assemblies 104 dig into the ground affect the target speed for installing dripline or other flexible tubing. For example, the target rate of pulling the apparatus 100 along the terrain might be 0.5 mph. At that speed, with four trenching blade assemblies 104 and fours hose guides 106, the apparatus 100 could bury two miles of dripline per hour. The goal might be, e.g., to complete a 100,000 sq ft surface area in a single 24-hour period, or as soon as possible. With a tractor PTO speed of 540 RPM, the drive shaft 124 on the apparatus 100 rotates at 226 RPM. With six blades per blade assembly 104, that rotation speed translates to 1,356 blade impacts by per minute against the ground, at about 0.4 inches of soil removed per impact, which hits the target of 0.5+ mph. A 100,000 square foot field at 16 inches spacing between hose guides translates to 75,187 square ft. (14.2 miles) of dripline is to be buried. If a ground speed of 0.5 mph average is sustained, a surface area of 100,000 sq ft can be installed in approximately seven hours (14.2 miles/2 mph). In direct comparison, a rotor irrigation system install typical of prior art devices would take approximately three to five days to complete the same size field.

As shown in FIG. 5, a curved hose guide ("J-sweep") 106 trails the trenching blade assembly. Each hose guide 106 comprises a J-shaped tube with an input aperture configured to receive hose from a hose reel 110 and an output aperture from which the hose exits the hose guide into a trench. A gusset 506 supports the J shaped tube and includes an angled plate 508 opposite the J shape tube. Gusset 506 is configured to prevent the J-sweep 106 from bending under pressure. The plate (lift ramp) 508 is configured to lift loose soil left behind by the trenching blade assembly 104 out of the trench before the hose is deposited in the trench.

FIGS. 6-10 depicts different views of a trenching blade assembly 104 in accordance with an illustrative embodiment. Each blade assembly 104 comprises a circular flange 804 with a central hole configured to fit over a shaft, shown most clearly in the right and left side views shown in FIGS. 8 and 9, respectively. The flange 804 might be welded to the rotating shaft 504. A number of trenching blades 802 are mounted radially around the circumference of the circular flange 804. In the present example, six blades 802 are coupled to a flange 804 to form a single trenching blade assembly 104. However, a higher or lower number of blades can be used according to application requirements. Each blade 802 might comprise three ⅜-inch thick plates (AR/T5) stacked with vertical and horizontal offsets.

Trenching blades 802 are designed to cut the ground and dig trenches at a linear rate of speed. The blades provide mechanical advantage to obtain speeds of up to 0.5+ mph as explained above, depending on soil conditions.

Each trenching blade 802 comprises a tip with a sloped thickness cross-section to shear the ground, cutting the trench on both the x and y axes. Each blade 802 is sloped on both the perpendicular axis (indicated by arrow B in FIG. 6) and the horizontal axis (indicated by arrow C in FIG. 8). As the blade moves through the dirt sheer forces work up the blade to the flange 804. The slopes allow shear on the perpendicular and horizontal axes, which enhances the speed at which the blades can dig a trench compared to a blade without the slopes.

Figures 6, 7:
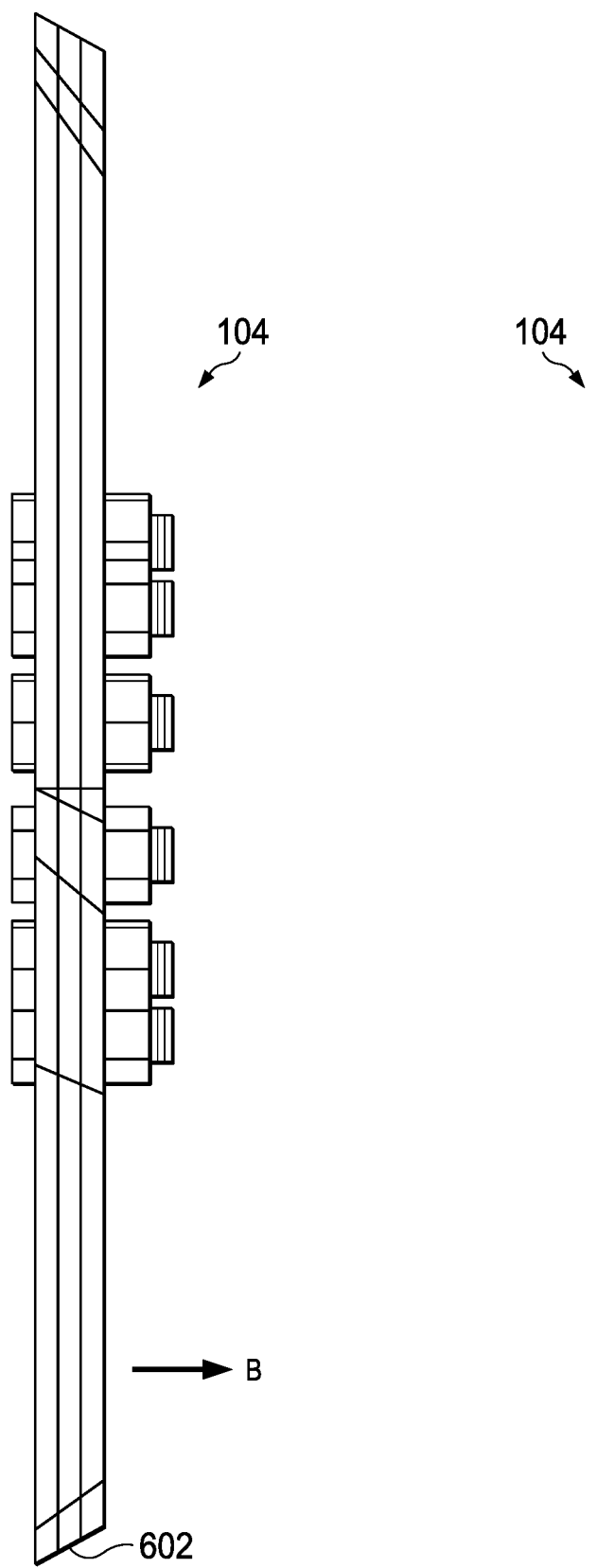
FIG. 6 depicts a front view of a trenching blade assembly for the subsurface tubing installation apparatus in accordance with an illustrative embodiment.
FIG. 7 depicts a rear view of a trenching blade assembly for the subsurface tubing installation apparatus in accordance with an illustrative embodiment.
Figure 8:
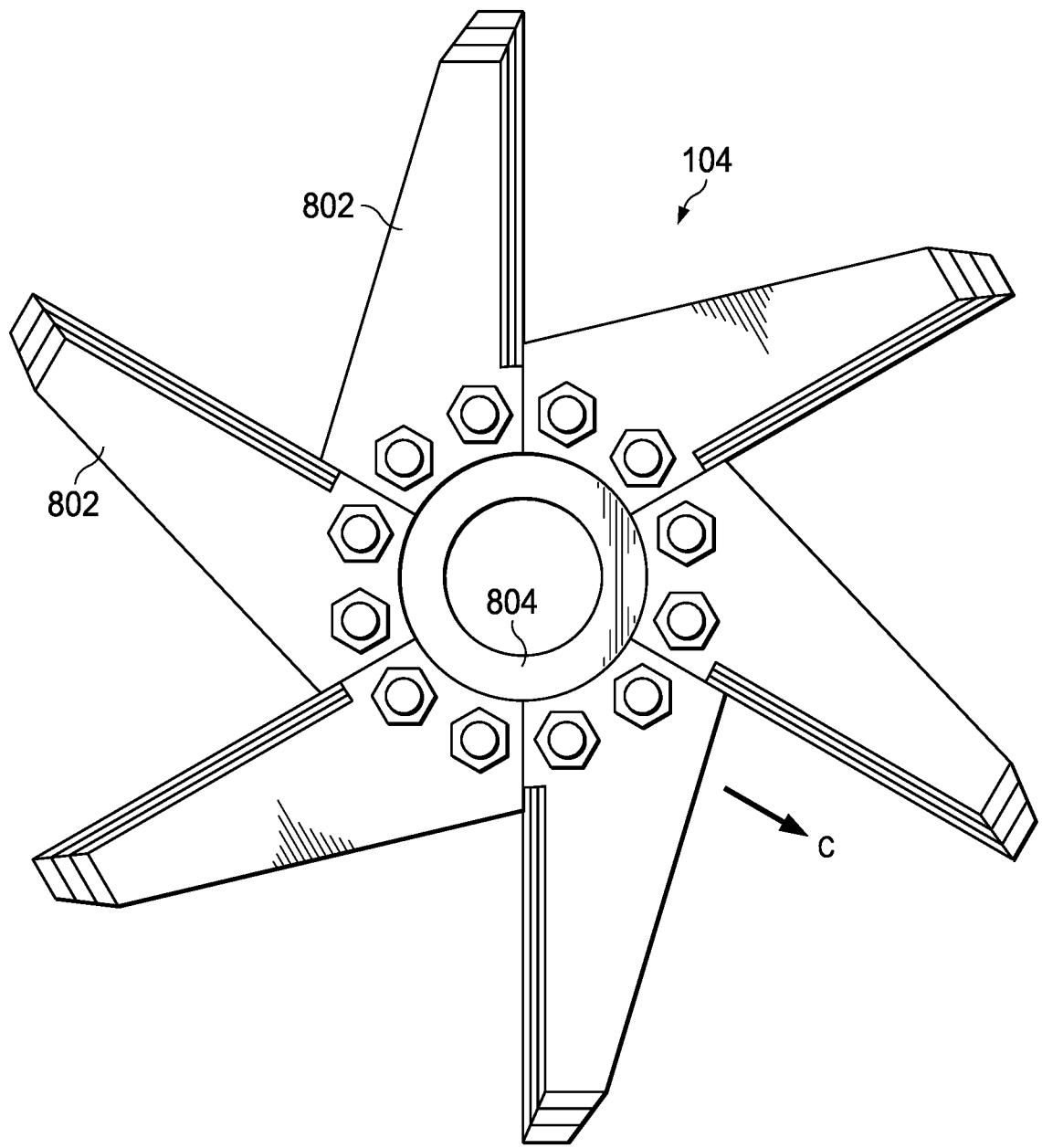
FIG. 8 depicts a right, side view of a trenching blade assembly for the subsurface tubing installation apparatus in accordance with an illustrative embodiment.
Figure 9:
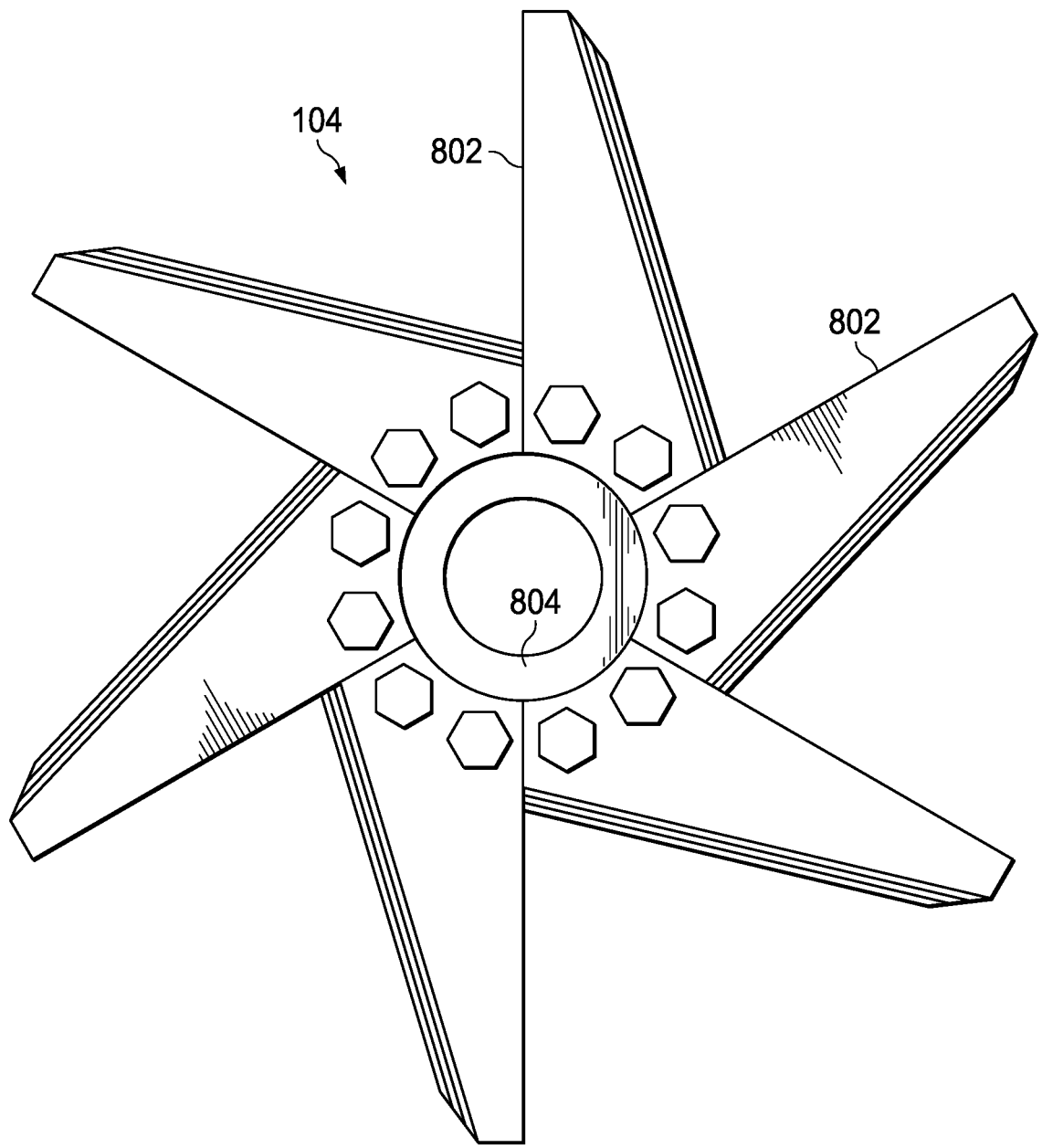
FIG. 9 depicts a left, side view of a trenching blade assembly for the subsurface tubing installation apparatus in accordance with an illustrative embodiment.
Figure 10:
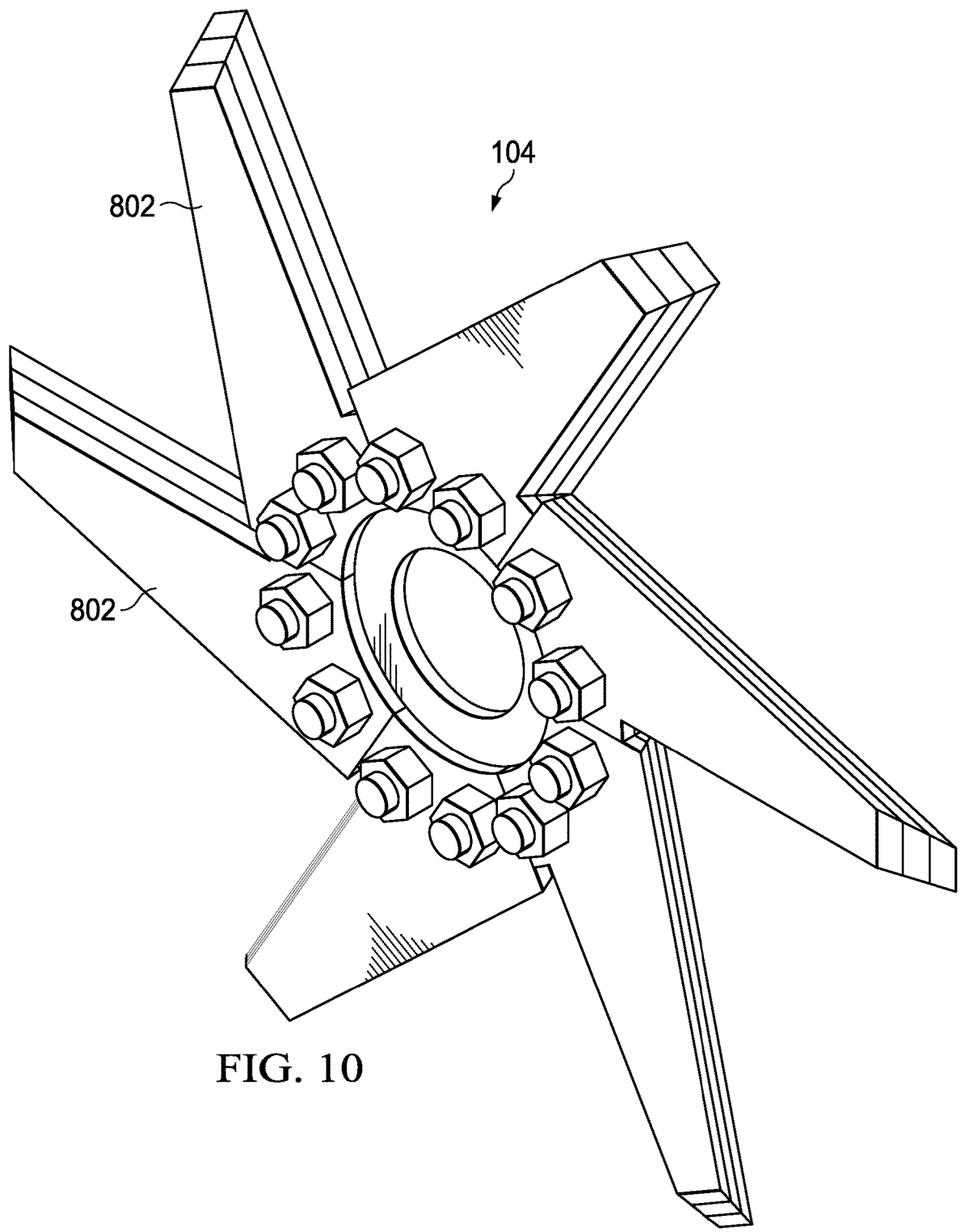
FIG. 10 depicts a rear perspective view of a trenching blade assembly for the subsurface tubing installation apparatus in accordance with an illustrative embodiment.

The slope 602 along the perpendicular axis causes approximately 65% of the soil excavated from the trench to be deposited to the right of the blade in the direction of the slope, indicated by arrow B in FIG. 6. By depositing the majority of excavated soil to one side of the trench, over half the excavated soil can be pushed back into the trench by the first passing soil blade on the trench filling attachment (described in detail below).

The design of trenching blade assembly 104 can be used with multiple applications in addition to dripline installation, such as, e.g., trench digging for flexible pipe. The only difference would be dimensions (e.g., flange size, blade width and length), but the design and proportions would remain the same for single and multi-row configurations.

Figure 11:
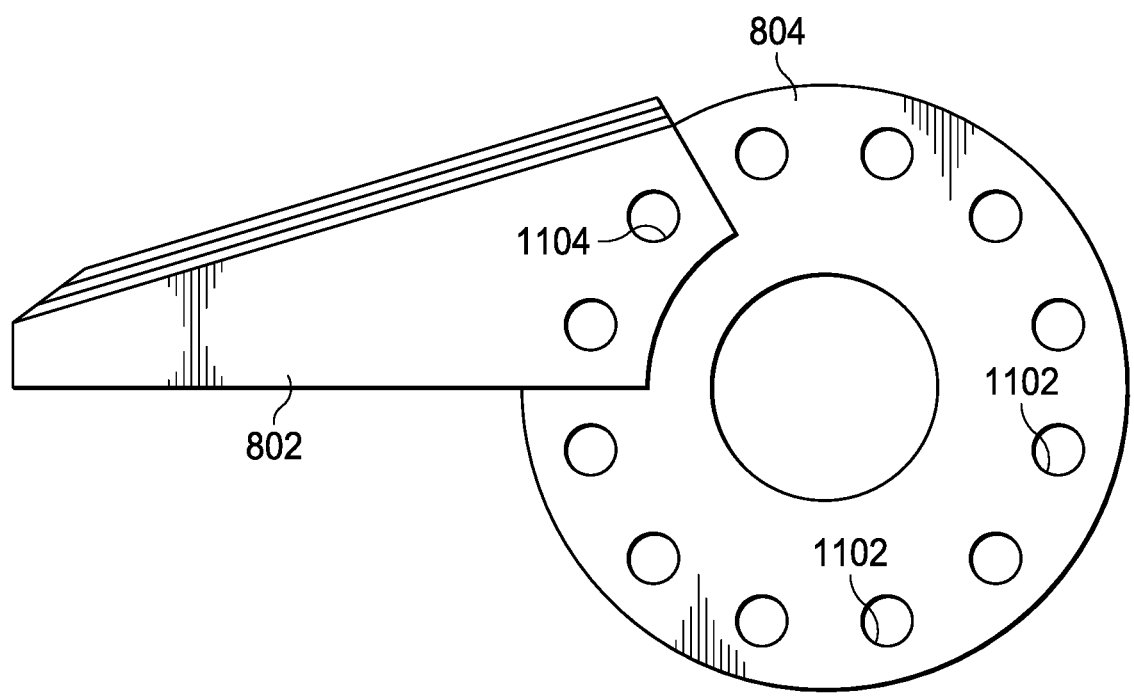
FIG. 11 depicts a flange mount for a trenching blade assembly for the subsurface tubing installation apparatus in accordance with an illustrative embodiment.

FIG. 11 depicts a flange mount for a trenching blade assembly for the subsurface tubing installation apparatus in accordance with an illustrative embodiment. Flange 804 comprises a number of bolt holes 1102 around its circumference. In the illustrated example, each trenching blade 802 comprises two corresponding bolt holes 1104 that align with the bolt holes 1104 in the flange 804, allowing the blades to be secured in place with nuts and bolts, as shown in FIGS. 6-10. Securing the separate blades 802 to the flange 804 via bolts allows for the blades to be replaced individually as needed.

Figure 12:
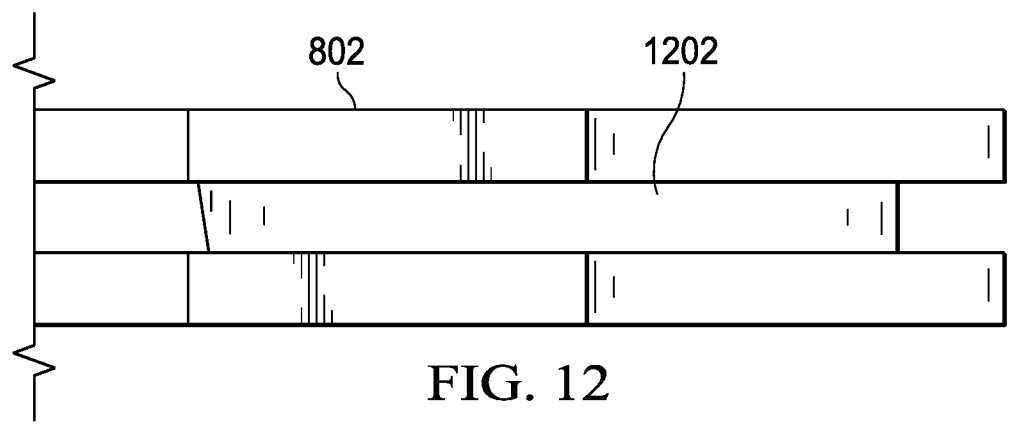
FIG. 12 depicts a groove in a trenching blade for coupling to a flange mount of a trenching blade assembly in accordance with an illustrative embodiment.
Figure 15:
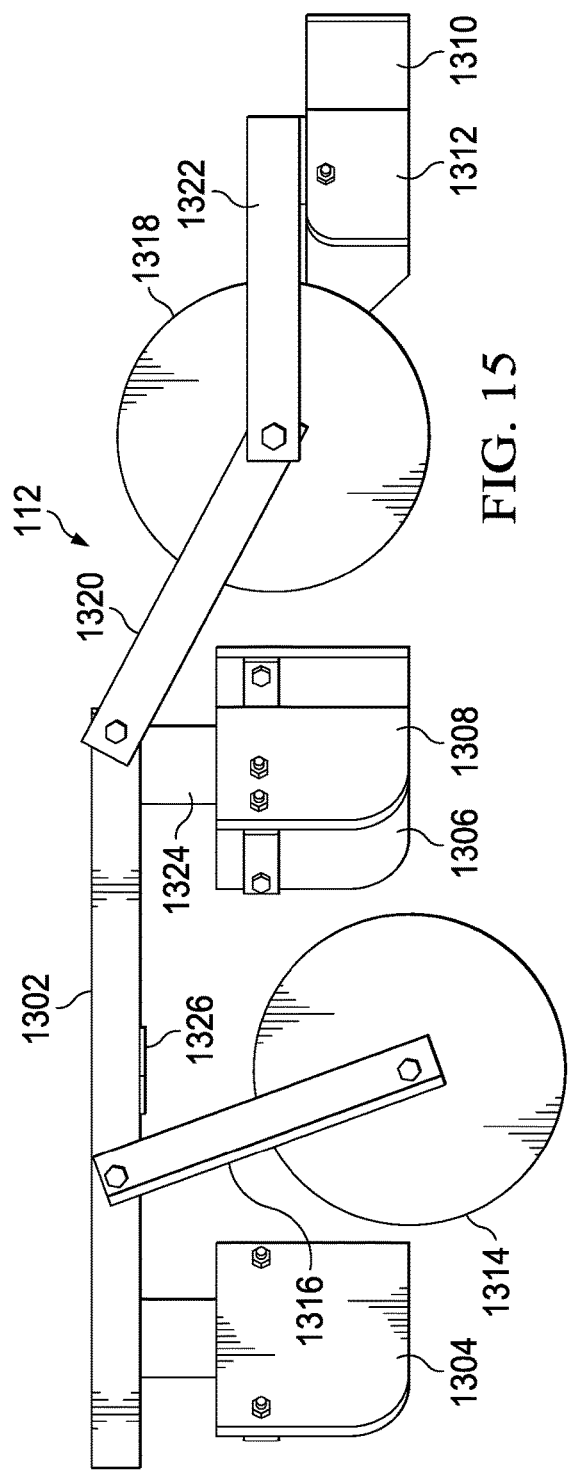
FIG. 15 depicts a right view of a soil grading and packing device attachment of a subsurface tubing installation apparatus in accordance with an illustrative embodiment.
Figure 16:
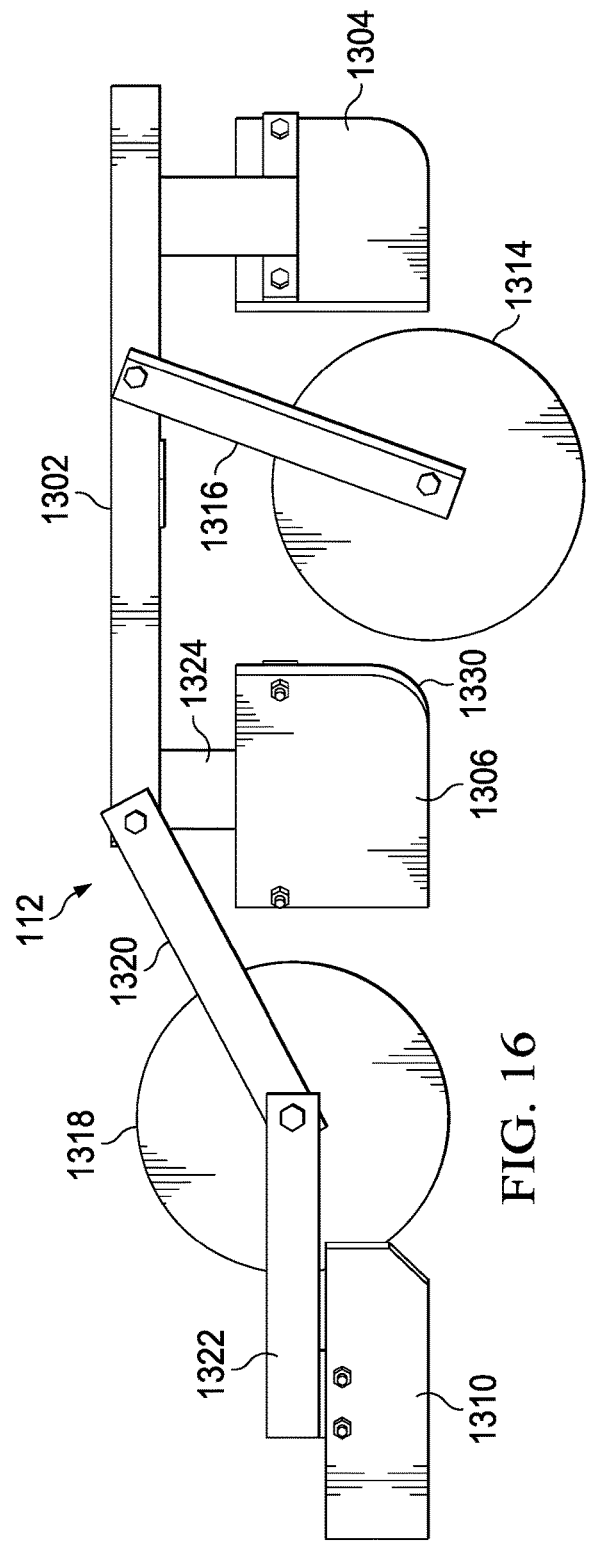
FIG. 16 depicts a left view of a soil grading and packing device attachment of a subsurface tubing installation apparatus in accordance with an illustrative embodiment.
Figure 17:
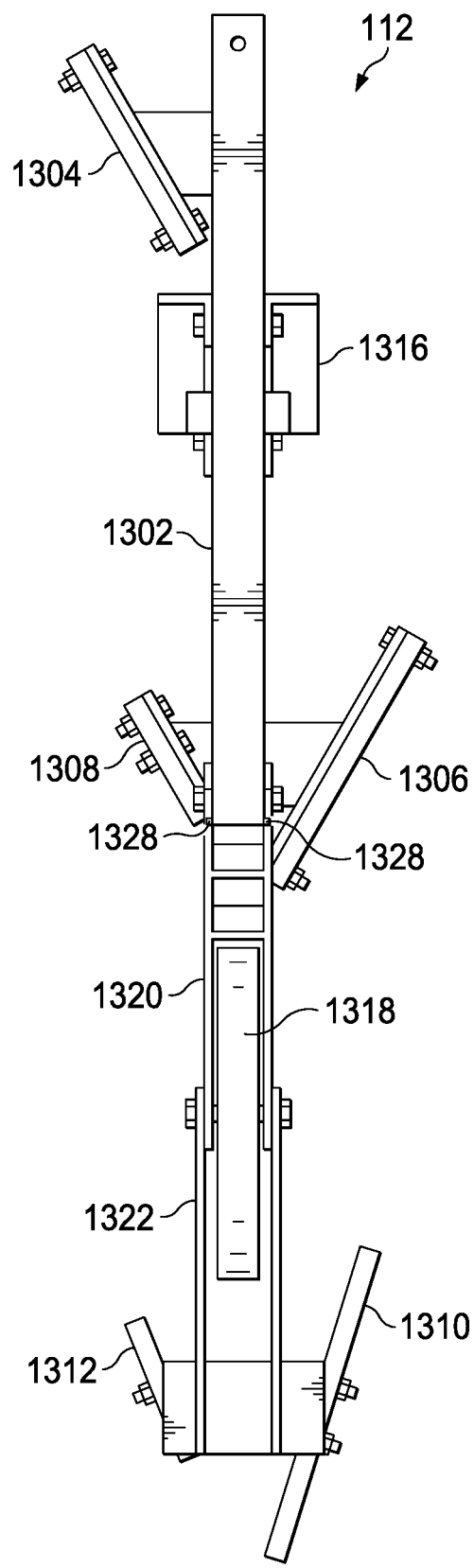
FIG. 17 depicts a top view of a soil grading and packing device attachment of a subsurface tubing installation apparatus in accordance with an illustrative embodiment.
Figure 18:
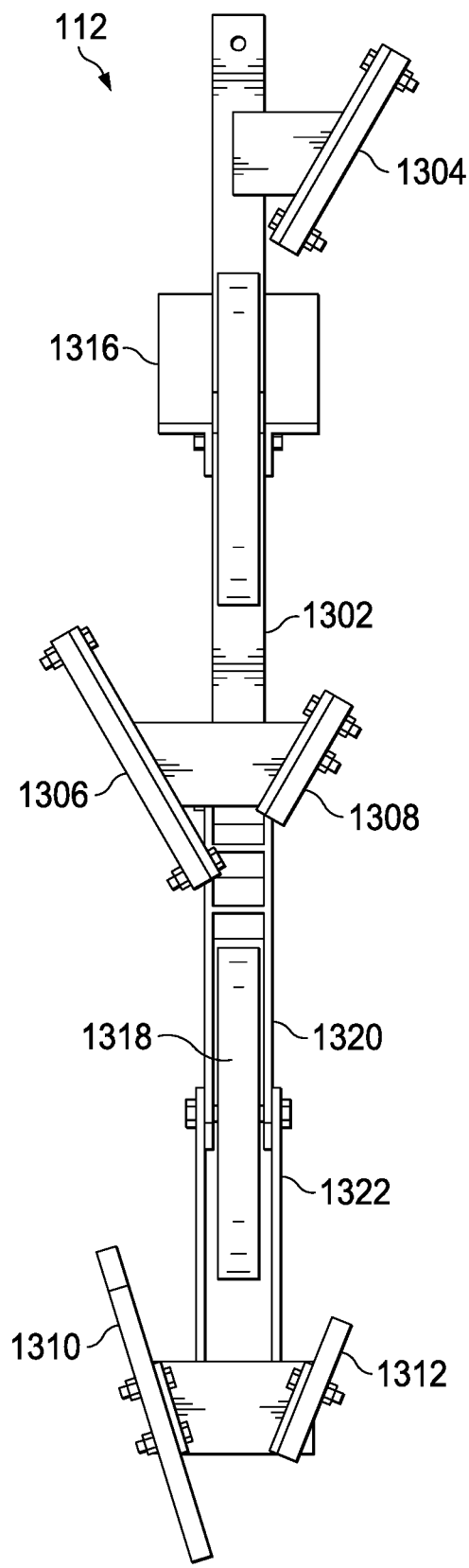
FIG. 18 depicts a bottom view of a soil grading and packing device attachment of a subsurface tubing installation apparatus in accordance with an illustrative embodiment.
Figure 19:
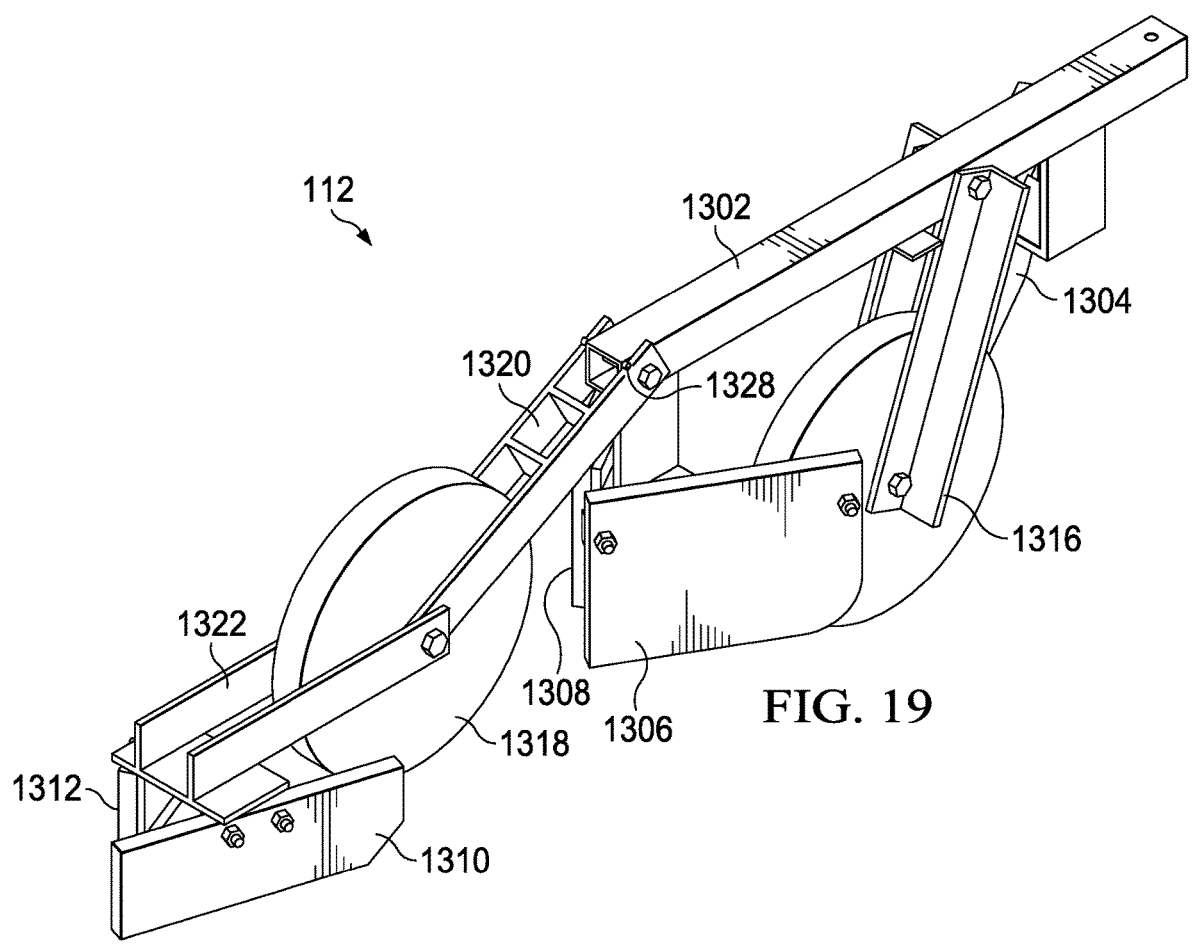
FIG. 19 depicts a top perspective view of a soil grading and packing device attachment of a subsurface tubing installation apparatus in accordance with an illustrative embodiment.

FIG. 12 depicts a groove 1202 in a trenching blade 802 for coupling to a flange mount of a trenching blade assembly in accordance with an illustrative embodiment. Groove 1202 is curved to match the circumference of the flange, allowing a close conformal fit of the blade to the flange.

FIGS. 13-20 depict different views of a trench filler-packer 112 (soil grading and packing device) in accordance with an illustrative embodiment. Each trench filler-packer 112 comprises a number of offset blades (also known as soil grades) that push excavated soil back into a trench over deposited dripline hose. Interspersed with the soil grades are packing wheels that pack down the returned soil in the trench.

In the example shown in FIGS. 13-20 the trench filler-packer 112 comprises a fixed central shaft 1302 that can be coupled to the crossbar 114 on the chassis 102. When connected to chassis 102, central shaft 1302 is aligned with a corresponding J-sweep and trenching blade assembly.

A first blade 1304 is connected to shaft 1302 and is angled outward to the right of the centerline of shaft 1302 toward the chassis. The first blade 1304 might be referred to has a main soil grade. Trailing behind blade 1304 is a first packing wheel 1314. First packing wheel 1314 is connected to shaft 1302 by a swinging arm 1316. Brace 1326 welded on central shaft 1302 limits how high swing arm 1316 can swing, thereby assisting the first packing wheel 1314 in packing down soil and preventing the soil from pushing the wheel away.

Trailing behind the first packing wheel 1314 are a second blade 1306 and third blade 1308 on opposite sides of the centerline. In an embodiment, blades 1306 and 1308 are approximately ⅛ of an inch on each side of the trench to push as much soil back into the trench as possible but with enough clearance to avoid problems getting stuck in the trench. Blade 1306 is angled outward to left of the centerline toward the chassis, and blade 1308 is angled outward to the right toward the chassis. Blade 1306 is also a main soil grade like blade 1304, having approximately the same length. Blade 1308 may be referred to as a mini soil grade with a length shorter than that of a main soil grade such as blades 1304 and 1306.

Figure 22:
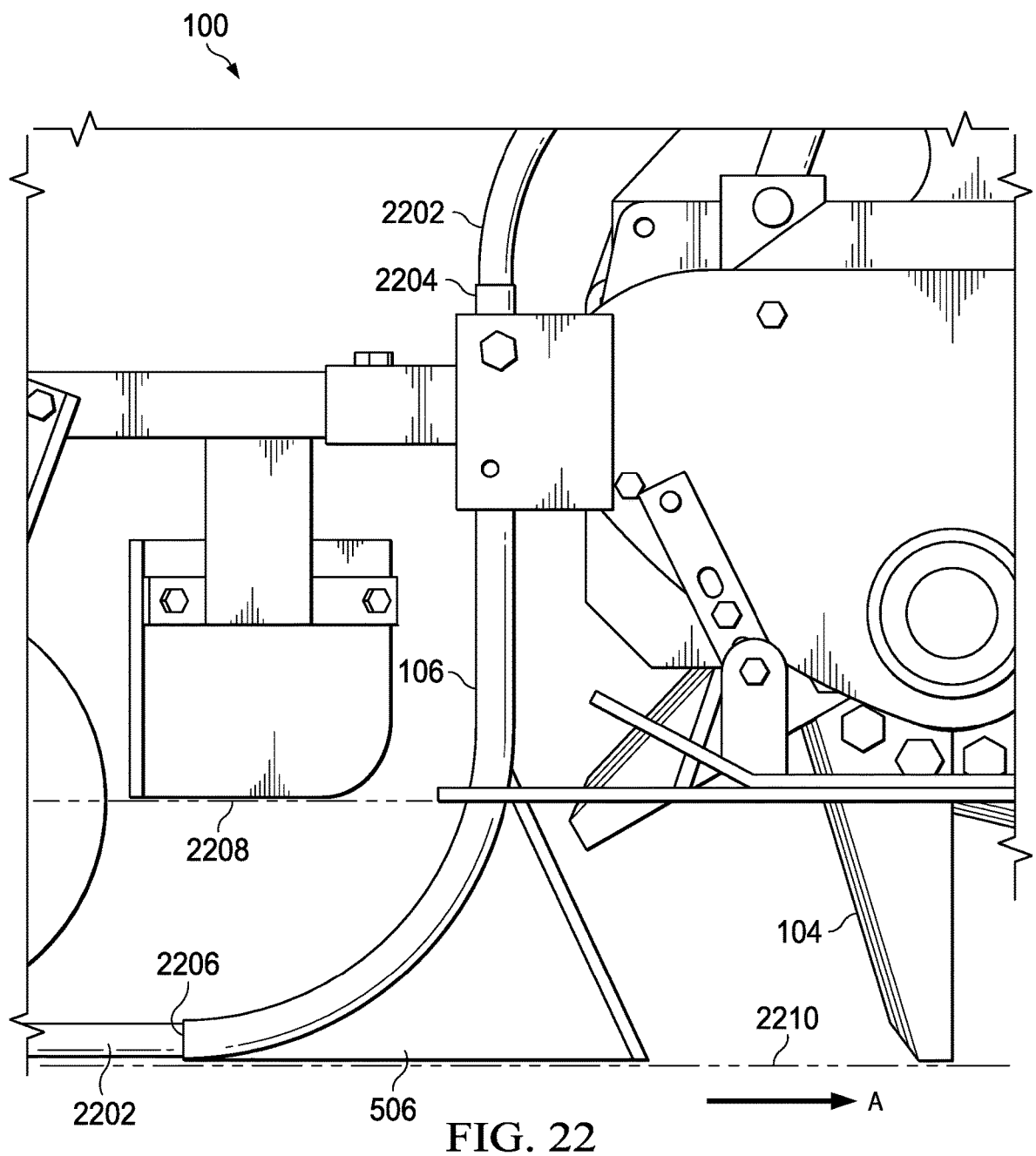
FIG. 22 illustrates subsurface installation of tubing in accordance with an illustrative embodiment.

Second blade 1306 and third blade 1308 are offset from each other, wherein a gap exists between the distal (from the chassis) ends of the blades, allowing soil to pass between them to prevent clogging, shown more clearly in FIG. 22. The positions of the blades 1306, 1308 can be adjusted forward or back on the mount 1324 to change the offset space between them.

A second packing wheel 1318 trails behind the second blade 1306 and third blade 1308. Second packing wheel 1318 is coupled to the distal (from the chassis) end of the central shaft 1302 by a second swing arm 1320. Similar to brace 1326, tack weld 1328 at the distal end of central shaft 1302 that limits the upward rotation of second swing arm 1320, thereby helping pack the soil.

Trailing the second packing wheel 1318 are a fourth blade 1310 and a fifth blade 1312. Fourth blade 1310 is a main soil grade and is angled outward to the left toward the chassis like second blade 1306. Fifth blade 1312 opposite the centerline from fourth blade 1310 is another mini grade angled outward to right of the centerline toward the chassis. Fourth blade 1310 and fifth blade 1312 are also offset at their distal ends to prevent clogging and can also be adjusted to increase or decrease the offset distance. The fourth blade 1310 and fifth blade 1312 are connected to a third swing arm 1322 that is connected to the axel passing through the second packing wheel 1318.

As shown in the figures, the lower leading edge 1330 of the blades might be rounded to prevent ground scarring.

The soil grade blades 1304, 1306, 1308, 1310, 1312 and packing wheels 1314, 1318 might be made from a durable thermoplastic polymer such as high-density polyethylene (HDPE). HDPE prevent soil from sticking to and gumming up the blades and packing wheels.

Figure 21:
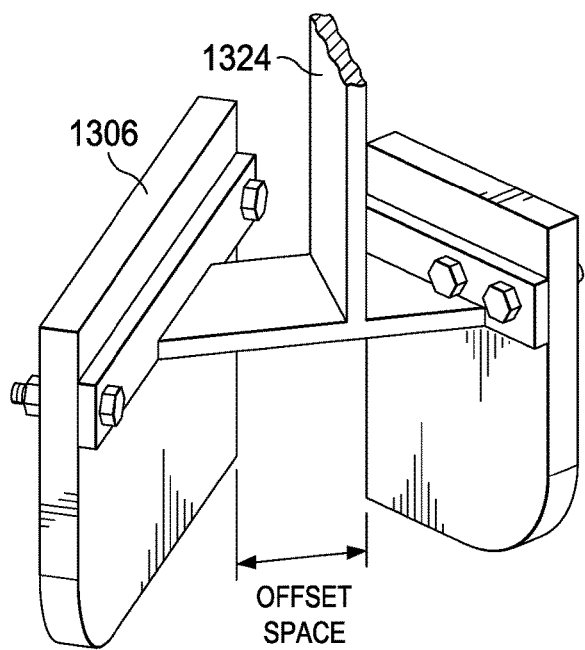
FIG. 21 depicts the offset between soil grade blades of the trench filling attachments in accordance with an illustrative embodiment.
Figure 20:
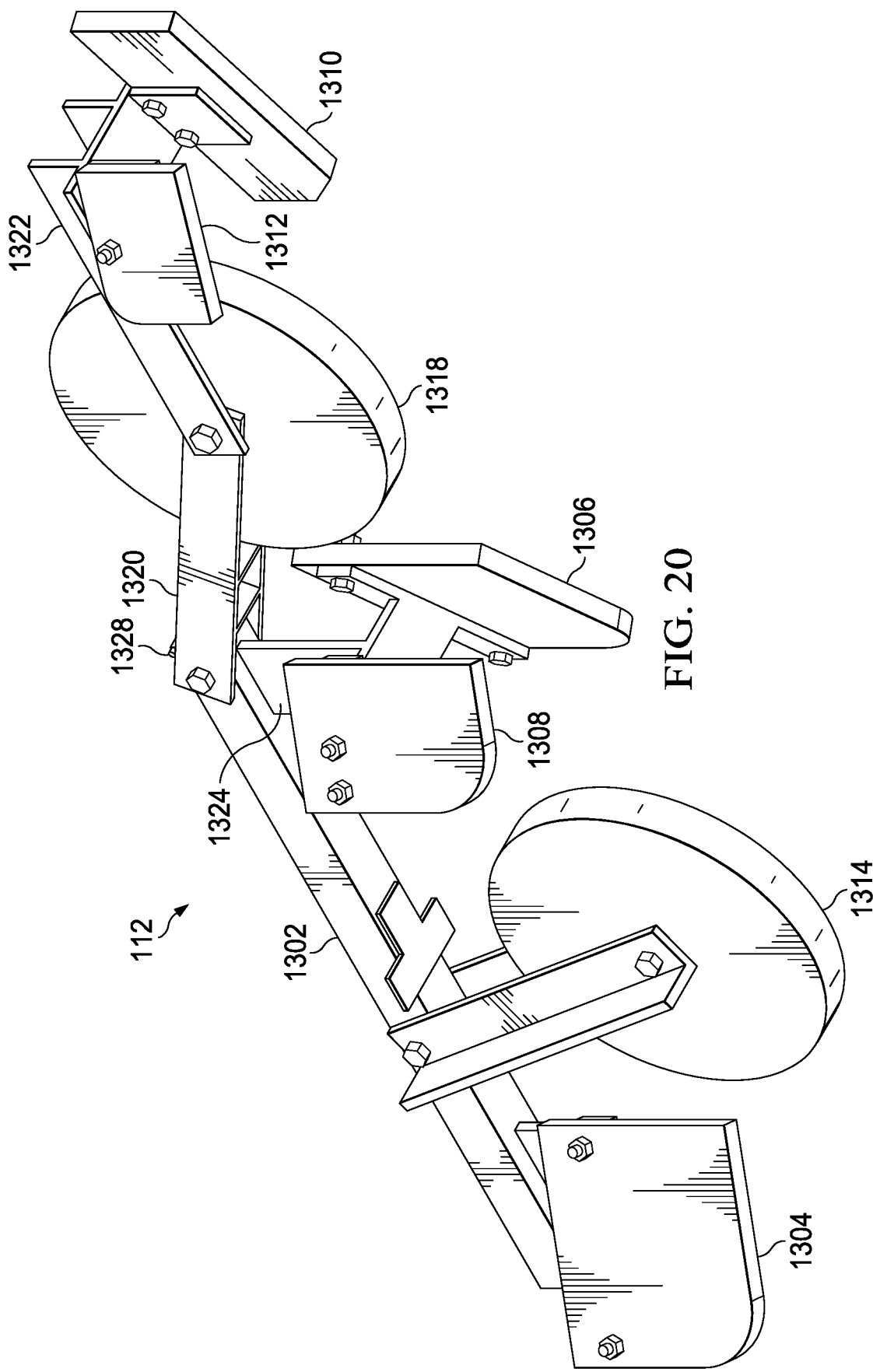
FIG. 20 depicts a bottom perspective view of a soil grading and packing device attachment of a subsurface tubing installation apparatus in accordance with an illustrative embodiment.

FIG. 21 depicts the offset between soil grade blades of the trench filling attachments in accordance with an illustrative embodiment.

FIG. 22 illustrates subsurface installation of tubing in accordance with an illustrative embodiment. As installation apparatus 100 is pulled over the ground surface 2208 in the direction of arrow A, trenching blade assemblies 104 dig trenches in the soil. The angled lift ramp 508 of the J-sweep hose guide 106 pushes remaining soil out of the trench as it moves forward.

Dripline 2202 is fed from a hose reel 110 into the input aperture 2204 of J-sweep 106. The dripline 2202 emerges from the output aperture 2206 of the J-sweep and is deposited on the bottom of the trench 2210.

FIG. 23 illustrates refilling and packing soil into trenches in accordance with an illustrative embodiment. As the dripline is deposited into the trench, the trench is immediately refilled with soil to bury the dripline.

Because of the slope in the ends of the trenching blades, the soil is deposited predominantly to the side of the slope. In the present example, as the tractor pulls the apparatus in the direction of arrow A approximately 65% of the excavated dirt is deposited to the left (in the picture). The first soil grade blade 1304 pushes dirt back into the trench.

As the first packing wheel 1314 rolls over the redeposited dirt, excess dirt is pushed to the right side. The second main soil grade 1306 catches the overflow soil with the assistance of mini soil grade 1308 and pushes it back into the trench before the second packing wheel 1318 passes over it.

After the second packing wheel 1318 passing over the trench, the remnants of soil not caught by the first three soil grades 1304, 1306, 1308 are caught by the last two blades 1310. 1312 and pushed into the trench. The offset between the blades allows the dirt/soil to flow without getting clogged.

The soil grade blades and packing wheels push and pack the excavated soil back into the trench in a serpentine manner by grading left to right, packing the soil, then grading right to left, etc. The alternating soil grades have the effect of sweeping the soil from different directions to move it into the trench, analogous to sweeping dirt into a central pile with a broom. The soil grades rely on their respective angles and being successively dragged over the same spot to gather as much soil as possible. The soil grades have no moving parts, thereby reducing the chances of mechanical failure or malfunction and enhancing durability.

Figure 24:
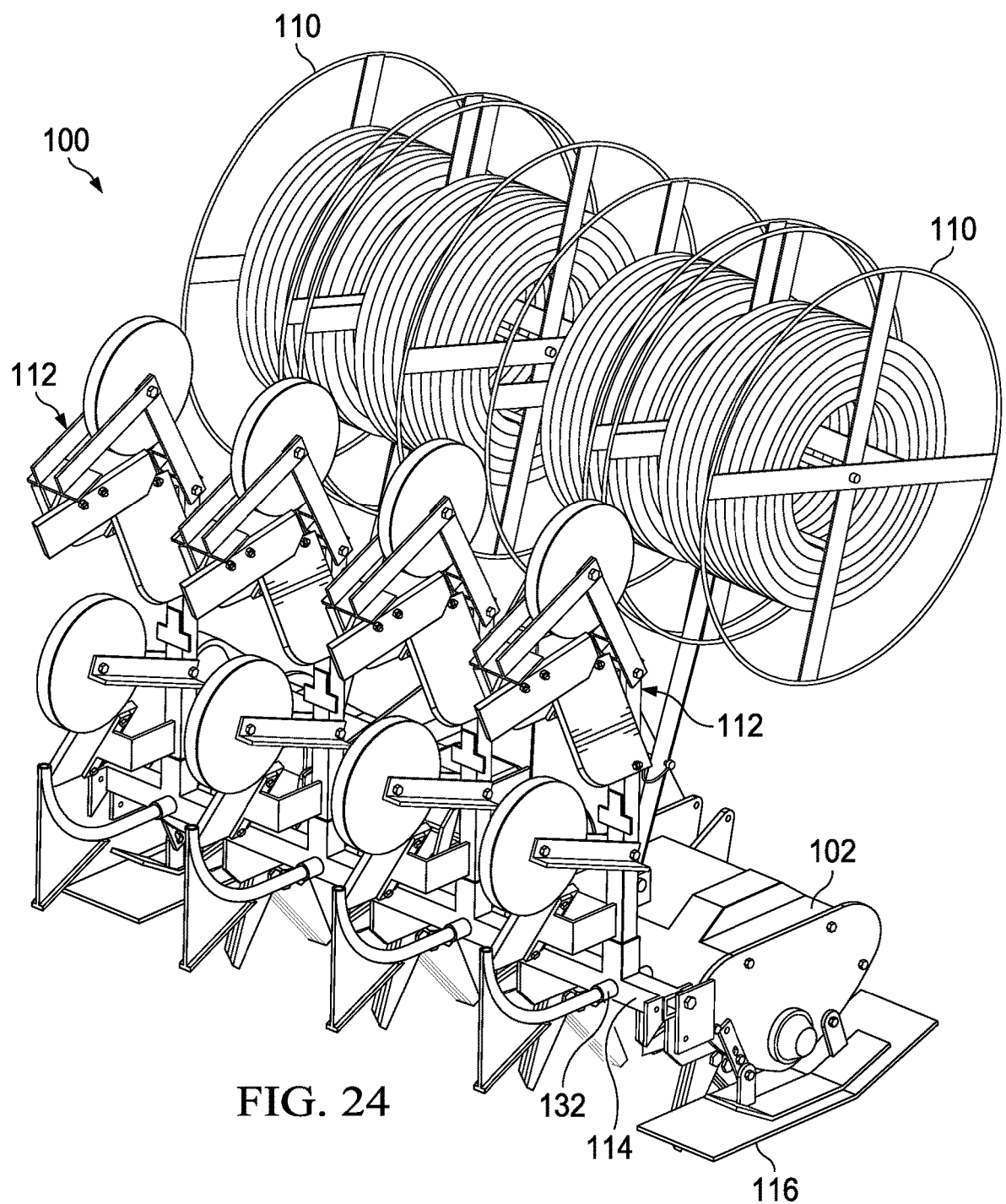
FIG. 24 depicts a subsurface tubing installation apparatus in a raised position in accordance with an illustrative embodiment.

FIG. 24 depicts a subsurface tubing installation apparatus in a raised position in accordance with an illustrative embodiment. This raise position can be used as the apparatus is turning between passes on a field during installation. It can also be used for stowing away the apparatus between uses.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus for installing multiple strands of hose simultaneously below a surface of terrain, the apparatus comprising:
   a chassis;
   two or more rotating trenching blade assemblies connected to the chassis approximately parallel to each other, wherein the trenching blade assemblies are configured to dig respective trenches in the terrain;
   two or more reel mounts connected to the chassis, wherein the reel mounts are configured to hold reels of hose;
   two or more curved hose guides connected to the chassis in trailing positions relative to the trenching blade assemblies, wherein each hose guide is aligned with a corresponding trenching blade assembly and is configured to receive hose from a respective hose reel mounted on one of the reel mounts and deposit the hose into a trench dug by the corresponding trenching blade assembly; and
   two or more trench filler-packers connected to the chassis in trailing positions relative to the hose guides, wherein each trench filler-packer is aligned with a corresponding hose guide, and wherein the trench filler-packers comprise blades configured to push soil excavated from the trenches back into the trenches;
   wherein each trench filler-packer comprises
      a first blade angled outward to a first side of a centerline toward the chassis, wherein the first blade is a first length;
      a first packing wheel trailing the first blade;
      a second blade trailing the first packing wheel, wherein the second blade is angled outward to a second side of the centerline toward the chassis, and wherein the second blade is the first length;

a third blade opposite the centerline from the second blade and angled outward to the first side of the centerline toward the chassis, wherein the third blade is a second length that is shorter than the first length, and wherein a gap exists between ends of the second blade and third blade that are distal from the chassis;

a second packing wheel trailing the second blade and third blade;

a fourth blade trailing the second packing wheel, wherein the fourth blade is angled outward to the second side of the centerline toward the chassis, and wherein the fourth blade is the first length; and a fifth blade opposite the centerline from the fourth blade and angled outward to the first side of the centerline toward the chassis, wherein the fifth blade is the second length, and wherein a gap exists between ends of the fourth blade and fifth blade that are distal from the chassis.

2. The apparatus of claim 1, wherein each trenching blade assembly comprises:
a circular flange with a central hole configured to fit over a shaft; and
two or more trenching blades mounted radially around a circumference of the circular flange, wherein each trenching blade comprises a tip with a sloped thickness cross-section.

3. The apparatus of claim 1, wherein each hose guide comprises:
a J-shaped tube with an input aperture configured to receive hose from the respective hose reel and an output aperture from which the hose exits the hose guide into the trench; and
a gusset supporting the J shaped tube and configured to prevent the J shaped tube from bending under pressure, wherein the gusset includes an angled plate opposite the J shape tube, wherein the plate is configured to lift soil out of the trench before the hose is deposited in the trench.

4. The apparatus of claim 1, wherein the packing wheels are configured to pack soil pushed into the trenches by the blades of the trench filler-packers.

5. The apparatus of claim 1, wherein:
the first blade, second blade, and third blade are connected to a fixed shaft connected to the chassis;
the first packing wheel is mounted on a first swing arm connected to the fixed shaft;
the second packing wheel is mounted on a second swing arm connected to an end of the fixed shaft distal to the chassis; and
the fourth blade and fifth blade are connected to a third swing arm that is connected to an axle passing through the second packing wheel.

6. The apparatus of claim 1, wherein heights of the trenching blade assemblies, hose guides, and trench filler-packers are adjustable.

7. The apparatus of claim 1, wherein the reel mounts comprise swiveling T bar racks.

8. The apparatus of claim 1, wherein the trenching blade assemblies are spaced 10 to 24 inches apart.

9. An apparatus for installing multiple strands of hose simultaneously below a surface of terrain, the apparatus comprising:
a chassis comprising a rotating shaft and a power take off gearbox differential configured to drive the shaft;
four trenching blade assemblies connected to the rotating shaft, wherein the trenching blade assemblies are spaced 10 to 24 inches apart and are configured to dig parallel trenches in the terrain;
two reel mounts connected to the chassis, wherein each reel mount comprises a swiveling T bar configured to hold two reels of coiled hose;
four curved hose guides connected to the chassis in trailing positions relative to the trenching blade assemblies, wherein each hose guide is aligned with a corresponding trenching blade assembly and comprises a tube configured to receive a hose from a respective hose reel mounted on one of the reel mounts and deposit the hose into a trench dug by the corresponding trenching blade assembly;
four trench filler-packers connected to the chassis in trailing positions relative to the hose guides, wherein each trench filler-packer is aligned with a corresponding hose guide, wherein each trench filler-packer comprises:
at least three successive blades offset from each other and configured to push soil excavated from one of the trenches back into the trench; and
at least two packing wheels interspersed with the blades, wherein the packing wheels are configured to pack soil pushed into the trench by the blades of the trench filler-packer.

10. The apparatus of claim 9, wherein heights of the trenching blade assemblies, hose guides, and trench filler-packers are adjustable.

11. A method of installing multiple strands of hose simultaneously below a surface of terrain, the method comprising:
moving an apparatus over the terrain, wherein the apparatus comprises:
a chassis;
two or more rotating trenching blade assemblies connected to the chassis approximately parallel to each other, wherein the trenching blade assemblies are configured to dig respective trenches in the terrain;
two or more reel mounts connected to the chassis, wherein the reel mounts are configured to hold reels of hose;
two or more curved hose guides connected to the chassis in trailing positions relative to the trenching blade assemblies, wherein each hose guide is aligned with a corresponding trenching blade assembly and is configured to receive hose from a respective hose reel mounted on one of the reel mounts and deposit the hose into a trench dug by the corresponding trenching blade assembly; and
two or more trench filler-packers connected to the chassis in trailing positions relative to the hose guides, wherein each trench filler-packer is aligned with a corresponding hose guide, and wherein the trench filler-packers comprise blades configured to push soil excavated from the trenches back into the trenches; and
feeding hose from reels on the reel mounts into the hose guides;
wherein each trench filler-packer of the apparatus comprises
a first blade angled outward to a first side of a centerline toward the chassis, wherein the first blade is a first length;
a first packing wheel trailing the first blade;
a second blade trailing the first packing wheel, wherein the second blade is angled outward to a second side of the centerline toward the chassis, and wherein the second blade is the first length;

a third blade opposite the centerline from the second blade and angled outward to the first side of the centerline toward the chassis, wherein the third blade is a second length that is shorter than the first length, and wherein a gap exists between ends of the second blade and third blade that are distal from the chassis;

a second packing wheel trailing the second blade and third blade;

a fourth blade trailing the second packing wheel, wherein the fourth blade is angled outward to the second side of the centerline toward the chassis, and wherein the fourth blade is the first length; and a fifth blade opposite the centerline from the fourth blade and angled outward to the first side of the centerline toward the chassis, wherein the fifth blade is the second length, and wherein a gap exists between ends of the fourth blade and fifth blade that are distal from the chassis.

12. The method of claim 11, wherein the hose comprises dripline.

13. The method of claim 11, wherein each trenching blade assembly of the apparatus comprises:

a circular flange with a central hole configured to fit over a shaft; and two or more trenching blades mounted radially around the circumference of the circular flange, wherein each trenching blade comprises a tip with a sloped thickness cross-section.

14. The method of claim 11, wherein each hose guide of the apparatus comprises:

a J shaped tube with an input aperture configured to receive hose from one of the hose reels and an output aperture from which the hose exits the hose guide into a trench; and a gusset supporting the J shaped tube and configured to prevent the J shaped tube from bending under pressure, wherein the gusset includes an angled plate opposite the J shape tube, wherein the plate is configured to lift soil out of the trench before the hose is deposited in the trench.

15. The method of claim 11, wherein:

the first blade, second blade, and third blade are connected to a fixed shaft connected to the chassis;

the first packing wheel is mounted on a first swing arm connected to the fixed shaft;

the second packing wheel is mounted on a second swing arm connected to an end of the fixed shaft distal to the chassis; and the fourth blade and fifth blade are connected to a third swing arm that is connected to an axle passing through the second packing wheel.

16. The method of claim 11, further comprising adjusting a height of one or more of the trenching blade assemblies, hose guides, and trench filler-packers to install the hose at a specified depth below the surface of the terrain.

17. The method of claim 11, wherein the reel mounts of the apparatus comprise swiveling T bar racks.

18. The method of claim 11, wherein the trenching blade assemblies are spaced 10 to 24 inches apart.

* * * * *